United States Patent [19]

Hart

[11] Patent Number: 5,081,909
[45] Date of Patent: Jan. 21, 1992

[54] RELEASABLE LATCH MECHANISM FOR ATTACHING AN ACTUATOR TO A VALVE

[75] Inventor: R. Hart, Northolt, Great Britain

[73] Assignee: National Oilwell (U.K.) Ltd., Cheshire, England

[21] Appl. No.: 554,058

[22] Filed: Jul. 16, 1990

[30] Foreign Application Priority Data

Jul. 21, 1989 [GB] United Kingdom ............... 8916744

[51] Int. Cl.⁵ ............................................. F15B 15/22
[52] U.S. Cl. ............................................. 92/14; 92/60; 92/128; 137/906; 251/63.6; 251/128
[58] Field of Search .............. 92/5 R, 60, 80, 82, 92/163, 165 R, 166, 128, 14, 28, 29, 27; 139/906; 251/62, 63.5, 63.6, 291, 128

[56] References Cited

U.S. PATENT DOCUMENTS

| | | | |
|---|---|---|---|
| 3,913,883 | 10/1975 | Irwin | 92/128 |
| 4,199,131 | 4/1980 | Boski et al. | 251/291 |
| 4,445,424 | 5/1984 | Foster et al. | 92/5 R |
| 4,470,430 | 9/1984 | Lancaster | 251/291 |
| 4,523,515 | 6/1985 | Smith | 92/128 |
| 4,634,099 | 1/1987 | Danko et al. | 251/291 |
| 4,637,419 | 1/1987 | Hughes | 251/63.6 |
| 4,699,355 | 10/1987 | Tomlin et al. | 251/62 |
| 4,759,263 | 7/1988 | Lehle | 92/128 |

FOREIGN PATENT DOCUMENTS 8706313 10/1987 PCT Int'l Appl. ............... 92/29

Primary Examiner—Edward K. Look
Assistant Examiner—Thomas Denion
Attorney, Agent, or Firm—Robert J. Bunyard; Larry A. Fillnow; Robert H. Johnson

[57] ABSTRACT

An actuator comprising a housing having a chamber and a piston slidably received within the chamber. The housing is provided with an inlet port to the chamber for the introduction of an operating fluid to cause the piston to slide within the chamber. The housing is provided with means for releasably attaching the actuator relative to a stem to be actuated. Additionally, the housing includes a plug for sealing an aperture to the chamber and receiving the stem. The plug moves into the chamber to enable the piston to act upon the stem via the plug.

6 Claims, 2 Drawing Sheets

RELEASABLE LATCH MECHANISM FOR ATTACHING AN ACTUATOR TO A VALVE

BACKGROUND OF THE INVENTION

1. Field of the Invention

The present invention relates to an actuator which is releasably attached to the apparatus which it is intended to operate. The actuator has a particular, but non-limiting, application to valve operation in oil production systems, especially sub-sea systems.

2. Description of the Prior Art

It is known to actuate a valve using a piston reciprocally received in a chamber and acting on the valve stem. Operating fluid is introduced into the chamber in order to drive the piston. In some arrangements operating fluid is present, at various times, on both sides of the piston. The chamber and its associated operating fluid passageways are charged when the actuator is attached to the valve. A seal prevents escape of the fluid between the chamber housing and the valve stem.

There are situations in which it would be advantageous for the actuator to be releasably attached to the valve, but in which charging with operating fluid subsequent to attachment of the actuator is not readily achievable. This problem can be acute in sub-sea applications. As the actuator is immersed, sea water will flood the chamber to one side of the piston, via the stem receiving aperture to the chamber. Moreover, the releasable attachment of the actuator is of little benefit if the attachment involves bolting or screwing of the actuator to the valve—especially in deep water applications where diver access is difficult or impossible.

SUMMARY OF THE INVENTION

With a view to providing an improved arrangement, the present invention resides in an actuator comprising a housing having a chamber and a piston slidably received within the chamber, the housing being provided with an inlet port to the chamber for the introduction of an operating fluid to cause the piston to slide within the chamber, wherein the housing is provided with means for releasably attaching the actuator relative to a stem to be actuated and includes a plug for sealing an aperture to the chamber and receiving the stem, the plug moving into the chamber to enable the piston to act upon the stem via the plug.

BRIEF DESCRIPTION OF THE DRAWINGS

An embodiment of the present invention will now be described by way of example only and with reference to the accompanying drawings, in which.

DETAILED DESCRIPTION OF THE PREFERRED EMBODIMENT

Figure 1:
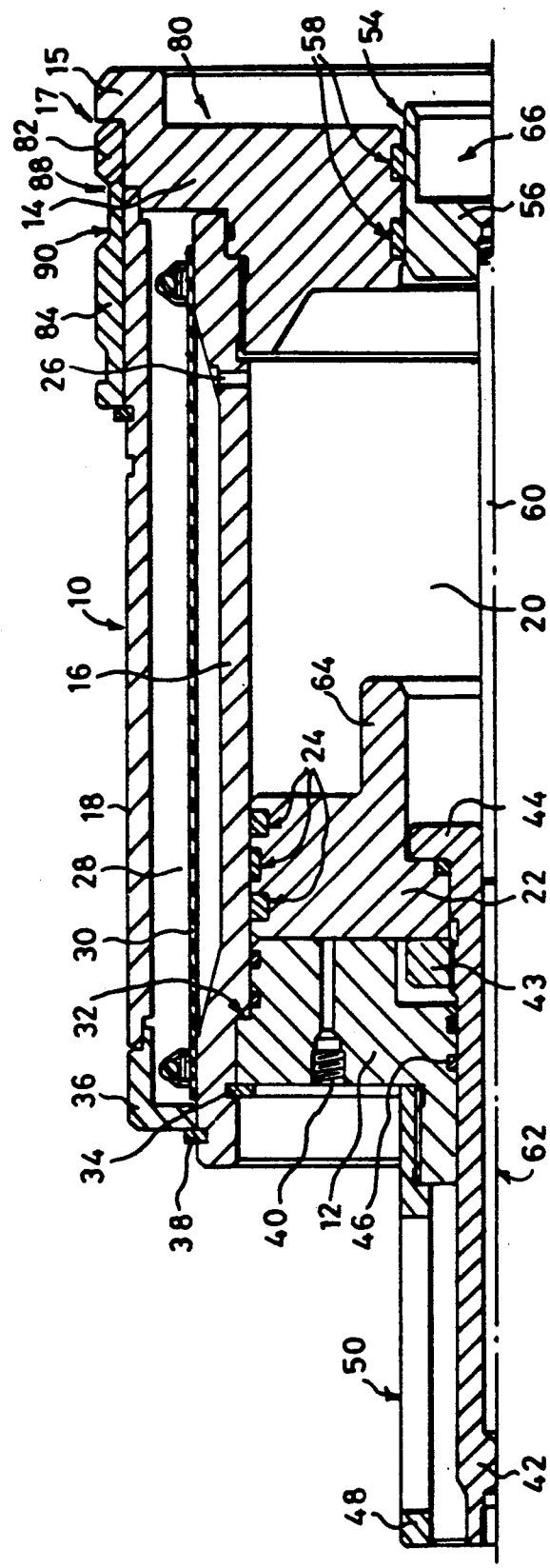
FIG. 1 is a diagrammatic partial sectional view through an actuator which embodies the present invention, prior to installation of the actuator on a valve.

The actuator illustrated in the accompanying drawings includes a housing 10 comprising a top cap 12, a bottom cap 14, an inner barrel 16 and an outer barrel 18. Inner barrel 16 and the two end caps 12, 14 define a chamber 20 within which a piston 22 is slidably received. That is, piston 22 is coaxial with barrel 16 and is in sliding contact with the inner surface thereof. Seals 24 are provided between the piston and the inner surface of the barrel. One or more radial passages 26 pass through barrel 16. Passage 26 allows fluid to flow out of chamber 20—as piston 22 slides from the top cap 12 towards the bottom cap 14. External barrel 18 is coaxial with inner barrel 16, so as to define an annular chamber 28 therebetween. A bladder 30 is secured to the outside of inner barrel 16 and, together with a radial profile on the outer surface of barrel 16, effectively divides chamber 28 into two annular portions. Fluid expelled from chamber 20 via port 26 is received between the outer surface of barrel 16 and the bladder 30, causing the bladder 30 to deflect outwards towards barrel 18. The bladder provides a pressure compensation device and fluid reservoir. As the piston is stroked the fluid in chamber 20 is displaced into the annular volume between cylinder 16 and bladder 30. Upon the pistons return the fluid is drawn back into the chamber 20. Equally because the bladder is elastomeric it will 'transmit' the hydrostatic head of the sea-water at any depth to the chamber side of the piston, hence balancing the hydrostatic head of the control fluid.

Both of the inner and outer barrels are supported on the bottom cap 14. Top cap 12 is retained against a shoulder 32 provided at the upper, inner end of barrel 16, by a split ring 34. The upper end of outer barrel 18 is held in place by an annular cap 36 which is retained on the outer surface of barrel 16 by a split ring 38.

Top cap 12 is provided with one or more inlet ports 40 which enable operating fluid to be forced into the housing. The introduction of operating fluid drives piston 22 towards bottom cap 14. An indicator rod 42, operatively held relative to the piston 22 by a flange 44, passes through a central aperture in top cap 12. Rod 42 is secured against piston 22 by a threaded nut 43. Seals 46 prevent the escape of operating fluid between cap 12 and rod 42. Rod 42 can be viewed from the outside of the actuator, thus providing an indication as to the relative position of piston 22 within chamber 20. A rigid sleeve 48 is attached to top cap 12 so as to protect the range of movement of rod 42. An aperture 50 is provided in sleeve 48, to enable easy viewing of rod 42.

Bottom cap 14 also has a central aperture which, in operation, receives the stem 52 of the valve to be operated. Prior to installation of the actuator, as shown in FIG. 1, the stem receiving aperture 54 is sealed by a displacement cap 56. Displacement cap 56 is slidable within aperture 54 against seals 58. Projecting from the upper surface of cap 56 is a guide rod 60 which passes through chamber 20 and is received in a central bore 62 provided in the indicator rod 42.

Figure 2:
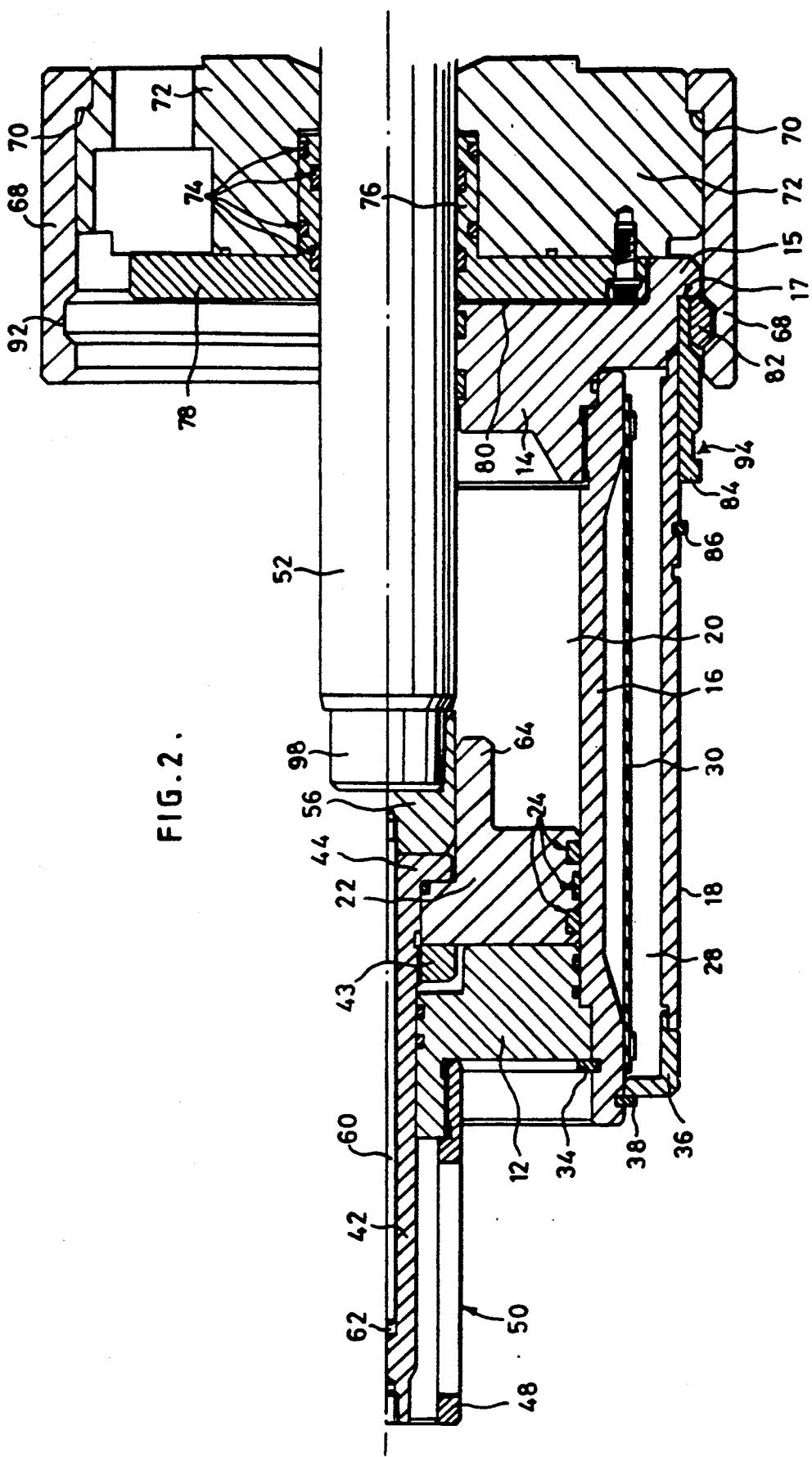
FIG. 2 is a view corresponding to FIG. 1 and in which the actuator is installed on a valve.

Piston 22 carries a boss 64 which projects from the surface of the piston facing bottom cap 14. Boss 64 has an enlarged internal bore, within which flange 44 of indicator rod 42 is received. Displacement cap 56 is provided with a central recess 66 which receives a reduced shank portion 98 at the end of valve stem 52, upon installation of the actuator upon the valve. Upon installation, the reduced shank 98 of stem 52 is received in a recess 66 and cap 56 is driven into chamber 20. Seals 58 seal against stem 52 such that there is no escape of fluid into or out of chamber 20 as the actuator is installed. Displacement of cap 56 and receipt of stem 52 within chamber 20 is guided by rod 60 which slides within the bore 62 of rod 42. When fully installed, as shown in FIG. 2, cap 56 is received within the enlarged bore in the boss 64 of piston 22.

The actuator is retained on the valve by means of a latch mechanism. As shown in FIG. 2, the valve is provided with a latch ring 68. This is retained by a shoulder 70 on the external circumference of valve bonnet 72. Valve stem 52 passes through a central aperture in bonnet 72, seals 74 being provided by a ferrule 76 integral with the flange 78. Flange 78 is bolted to the top of bonnet 72. The bottom cap 14 is provided with a recess 80 which receives the flange 78. That is, the base 15 of cap 14 has approximately the same diameter as the internal cylindrical surface of latch ring 68 whereas the diameter of flange 78 is somewhat smaller. Thus, cap 14 lands on bonnet 72.

Once the actuator has been landed, the latch mechanism is operated. In addition to latch ring 68, the latch mechanism includes a split ring 82 and an activator sleeve 84. Components 82 and 84 are carried on the external surface of barrel 18 and are retained against a shoulder 17. Shoulder 17 is formed by base 15 and rearward movement is limited by a circlip 86. Activator sleeve 84 slides on the external surface of barrel 18. At its lower end, sleeve 84 is provided with a bevelled face 88 which, prior to activation of the mechanism, is in contact with a correspondingly bevelled surface on split ring 82.

The latch mechanism is operated by activator sleeve 84 being driven towards the valve. Face 88 causes split ring 82 to expand radially outwards and ride up on to a flat shoulder 90 which is provided on the external circumference of activator sleeve 84. As will be apparent from FIG. 2, this operation is undertaken with cap 14 landed on bonnet 72 with the result that split ring 82 is forced into the complimentary shape of annular groove 92 provided on the inner surface of latch ring 68.

Once split ring 82 has ridden up onto shoulder 90, the latch mechanism is effectively locked and the actuator and valve are secured together. The upper external portion of activator sleeve 84 is provided with a profile 94 to receive a working tool (not shown) so as to enable activator sleeve 84 to be retracted along barrel 18, thus releasing the latch mechanism.

It will be apparent from the above description that the actuator is releasably secured to the valve in a manner enabling installation and replacement thereof by a remotely operated vehicle (ROV). Only a simple single stroke is required to operate the latch mechanism. This is ideally suited to sub-sea applications. It will also be appreciated that the actuator is an environmentally sealed unit which greatly enhances its use in sub-sea applications. The arrangement is particularly beneficial in deep sea applications where diver assistance is difficult or impossible.

The displacement cap arrangement described above is preferred to arrangements which, for example, might use a 'free moving' separate stem in place of the cap. The addition of a separate stem would increase the displaced volume, and possibly increase the length of the actuator, to ensure that the separate stem could be adequately supported until it was received in the piston. Such increased length would be undesirable. Likewise, because the bladder is elastomeric, if the piston was fully stroked prior to installation, the fluid in the bladder would be under pressure. Small at first, the pressure would increase as the actuator proceeds deeper subsea. This would require differential pressure to be held in the actuator during replacement, which again may be undesirable.

One embodiment of the invention has been described with reference to the accompanying drawings. It will readily be apparent to persons skilled in the art that many modifications can be made, and alternative embodiments implemented, without departing from the scope of the invention. Such modifications and alternative embodiments fall within the scope of the inventive concept.

What I claim is:

1. An actuator comprising a housing having a chamber and a piston slidably received within the chamber, the housing including two concentric barrels, an inlet port to the chamber for the introduction of an operating fluid to cause the piston to slide within the chamber and a resiliently expandable section for accommodating operating fluid displaced during the operating stroke of the piston, wherein the housing is provided with means for releasably attaching the actuator relative to a stem to be actuated and a plug for sealing an aperture to the chamber and receiving the stem, the plug moving into the chamber to enable the piston to act upon the stem via the plug.

2. An actuator as claimed in claim 1, wherein the resiliently expandable portion of the housing comprises a bladder located between the sleeves.

3. An actuator comprising a housing having a chamber and a piston slidably received within the chamber, the housing including an inlet port to the chamber for the introduction of an operating fluid to cause the piston to slide within the chamber, a resiliently expandable section to accommodate the fluid displaced during the operating stroke of the piston and two end caps spaced apart by two concentric barrels, wherein the housing is provided with means for releasably attaching the actuator relative to a stem to be actuated and a plug for sealing an aperture to the chamber and receiving the stem, the sealed aperture being located in one of the end caps, the plug moving into the chamber to enable the piston to act upon the stem via the plug.

4. An actuator as claimed in claim 3, wherein the resiliently expandable portion of the housing comprises a bladder located between the sleeves.

5. An actuator comprising a housing having a chamber and a piston slidably received within the chamber, the housing being provided with an inlet port to the chamber for the introduction of an operating fluid to cause the piston to slide within the chamber, wherein the housing includes means for releasably attaching the actuator relative to a stem to be actuated and a plug for sealing an aperture to the chamber and receiving the stem, the attaching means including a split ring and an activator sleeve, the plug moving into the chamber to enable the piston to act upon the stem via the plug.

6. An actuator comprising a housing having a chamber and a piston slidably received within the chamber, the piston carrying an indicator rod extending through the housing thereby providing an indication of the location of the piston within the chamber,
   the housing including an inlet port to the chamber for the introduction of an operating fluid to cause the piston to slide within the chamber, means for releasably attaching the actuator relative to a stem to be actuated, a plug for sealing an aperture to the chamber and for receiving the stem,
   the plug including a guide rod extending through a central aperture provided in the piston,
   the guide rod received in a central bore provided in the indicator rod whereby the plug moves into the chamber to enable the piston to act upon the stem via the plug.

* * * * *